(12) United States Patent
Huegle

(10) Patent No.: US 11,343,873 B2
(45) Date of Patent: May 24, 2022

(54) BLOWER SYSTEM, BLOWER AND METHOD FOR OPERATING AND FOR INSTALLING A BLOWER

(71) Applicant: GCS GMBH, Ehingen Heufelden (DE)

(72) Inventor: Markus Huegle, Ehingen Heufelden (DE)

(73) Assignee: GCS GmbH, Ehingen Heufelden (DE)

( * ) Notice: Subject to any disclaimer, the term of this patent is extended or adjusted under 35 U.S.C. 154(b) by 5 days.

(21) Appl. No.: 16/929,958

(22) Filed: Jul. 15, 2020

(65) Prior Publication Data

US 2020/0351986 A1 Nov. 5, 2020

Related U.S. Application Data

(63) Continuation of application No. PCT/EP2019/050612, filed on Jan. 11, 2019.

(30) Foreign Application Priority Data

Jan. 15, 2018 (DE) ...................... 10 2018 100 718.3

(51) Int. Cl.
*H04W 84/18* (2009.01)
*H04W 76/10* (2018.01)
(Continued)

(52) U.S. Cl.
CPC ............ *H04W 84/18* (2013.01); *G08C 17/02* (2013.01); *H04L 45/121* (2013.01);
(Continued)

(58) Field of Classification Search
CPC ..... H04W 84/18; H04W 76/10; H04W 52/34; H04W 84/22; G08C 17/02; H04L 45/121
(Continued)

(56) References Cited

U.S. PATENT DOCUMENTS 9,668,327 B2 5/2017 Dobai et al.
10,812,444 B2 10/2020 Humm
(Continued)

FOREIGN PATENT DOCUMENTS

DE 202016104114 U1 8/2016
EP 1826498 A1 * 8/2007 .............. F24F 11/30
(Continued)

OTHER PUBLICATIONS

International Search Report dated Apr. 5, 2019 in corresponding application PCT/EP2019/050612.
Summary of standard IEEE 802.11s as per Mar. 4, 2021.

*Primary Examiner* — Obaidul Huq
(74) *Attorney, Agent, or Firm* — Muncy, Geissler, Olds & Lowe, P.C.

(57) ABSTRACT

A blower system having a control and operating unit for controlling a plurality of blowers. At least one Mesh Access Point that is in contact with the control and operating unit in a wireless or wired manner is furthermore provided, which Mesh Access Point is designed to construct a Mesh network such that at least one of the blowers has a wired or wireless Mesh connection to the Mesh Access Point, and that each of the blowers is able to be connected to at least one further blower in a wireless or wired manner in order to transmit data between the blowers of the control and operating unit. The invention furthermore relates to a blower for the blower system, to a method for installing a blower system and to a method for operating a blower system.

2 Claims, 2 Drawing Sheets

(51) Int. Cl.
*G08C 17/02* (2006.01)
*H04L 45/121* (2022.01)
*H04W 52/34* (2009.01)
*H04W 84/22* (2009.01)

(52) U.S. Cl.
CPC ........... *H04W 52/34* (2013.01); *H04W 76/10* (2018.02); *H04W 84/22* (2013.01)

(58) Field of Classification Search
USPC ........................................ 370/310, 328, 338
See application file for complete search history.

(56) References Cited

U.S. PATENT DOCUMENTS

| | | | |
|---|---|---|---|
| 2014/0207290 A1* | 7/2014 | Crawford | H04W 8/22 700/276 |
| 2015/0372875 A1 | 12/2015 | Turon et al. | |
| 2017/0048189 A1* | 2/2017 | Humm | H04W 4/80 |
| 2018/0224143 A1* | 8/2018 | Anderson | F24F 11/56 |

FOREIGN PATENT DOCUMENTS

| WO | WO2008097992 A1 | 8/2008 |
|---|---|---|
| WO | WO2015032679 A1 | 3/2015 |

* cited by examiner

BLOWER SYSTEM, BLOWER AND METHOD FOR OPERATING AND FOR INSTALLING A BLOWER

This nonprovisional application is a continuation of International Application No. PCT/EP2019/050612, which was filed on Jan. 11, 2019, and which claims priority to German Patent Application No. 10 2018 100 718.3, which was filed in Germany on Jan. 15, 2018, and which are both herein incorporated by reference.

BACKGROUND OF THE INVENTION

Field of the Invention

The present invention relates to a blower system, a blower for a blower system, a method for installing a blower system and a method for operating a blower system.

Description of the Background Art

In the prior art, a blower system for clean rooms is described, for example, in DE 20 2016 104 114 U1, which corresponds to US 2017/0048189. In it, a plurality of blowers form a network, wherein the blowers communicate with a control and operating unit in a wireless or wired manner within the network. A disadvantage of this blower system is that the failure of a single blower can lead to failure of all the communication paths, thereby rendering a plurality of blowers to be no longer controllable by the control and operating unit. Furthermore, the size of the blower system or the network is restricted to the area in which a wired connection is available or to a receiving range of the wireless connection.

SUMMARY OF THE INVENTION

It is therefore an object of the present invention to provide a blower system, a blower, a method for installing a blower system and a method for operating a blower system, by means of which the above mentioned disadvantages are reduced.

The object relating to the blower system is achieved by a blower system in particular for a clean room, with a control and operating unit for controlling a plurality of blowers, wherein at least one Mesh Access Point is provided, which is in wireless or wired contact with the control and operating unit and which is designed to construct a Mesh network such that at least one of the blowers in in a wireless or wired Mesh connection with the Mesh Access Point and that each of the blowers is able to be connected to at least one further blower in a wireless or wired manner in order to transmit data between the blowers and the control and operating unit.

By constructing a Mesh network, the blowers of the blower system can be connected to one another and via at least one Mesh Access Point to the control and operating unit in a wireless or wired manner. This creates a plurality of data connection paths, so that the failure of a single blower can be compensated for by one of the other possible data connection paths. In addition, the size of the network and thus of the blower system is not limited to the receiving range, i.e., a Mesh transmitting and receiving range of the Mesh Access Point, but rather can be expanded as required by a blower outside the Mesh transmitting and receiving range, with the aid of additional wireless or wired blower connections at the edge of the Mesh transmitting and receiving range.

The Mesh network preferably complies with the IEE 802.11S standard, so that the blowers construct a wireless Mesh network with one another and forward frames for the blowers outside of the Mesh transmitting and receiving range. As a WLAN Access Point, i.e., as a Mesh Access Point, a NEXCOM® IWF 300 can be used, for example.

The adjacent blowers can be wirelessly connected to one another, each blower can be assigned a wireless transmitting and receiving range and the blowers can be arranged to each other in such a way that at least one other blower or a Mesh Access Point is located within their spatial transmitting and receiving range. With a wireless connection, the blower system can be made more flexible and installed more easily. Sources of error during installation due to incorrect wiring between the blowers and/or between the blowers and the control and operating unit are thereby avoided. At the same time, a more user-friendly control of the blowers is made possible. Due to the plurality of possible data connection paths in a wireless connection of the blowers, failure of a group of blowers or even of the whole network due to the failure of a single blower can be prevented by interrupting the secondary data connection path.

In order to expand the blower system and thus the network, and in order to increase the accessibility of each individual blowers further, it is preferred when a plurality of Mesh Access Points with a respective Mesh transmitting and receiving range are provided, which are disposed to one another in such a manner that in each case at least two Mesh transmitting and receiving ranges at least partially overlap. Alternatively, a plurality of Mesh transmitting and receiving ranges can also at least partially overlap or all Mesh transmitting and receiving ranges of all Mesh Access Points can at least partially overlap.

The control and operating unit can be designed as a building management system (BMS) and that a BMS gateway is provided in order to transmit data between one of the Mesh Access Points and the building management system. The BMS Gateway makes it possible to install or set up the blower system in buildings with an already existing BMS. The blower system is thus compatible with already existing BMS, increasing possible uses of the blower system. The BMS gateway serves both as an "interpreter" between the Mesh Access Point and the BMS, but in a preferred embodiment may be designed to collect information in order to provide or to simplify statistical evaluations and analyses. For example, the BMS gateway can collect statistics about the number of errors that have occurred per unit of time, per blower and/or per blower group, as well as statistics about the operating parameters of a blower group. For this purpose, the control and operating unit or the BMS gateway preferably additionally has a Modbus TCP/IP interface for direct communication with the blowers of the blower system, which also each comprise a Modbus TCP/IP interface. In a further preferred embodiment, the BMS gateway can have security mechanisms which prevent unintentional or unauthorized access to the blowers.

In particular, it is preferred if a blower, which is adjacent to one of the blowers and is located within the same Mesh transmitting and receiving range, is formed as an intermediary blower, which can be connected to the blower and serves as a data node. A data node is a point where the communication of several blowers converges. Consequently, the intermediary blower can receive data, for example via the operating mode of the blower associated with it, and/or receive error messages from the blower and forward said data and messages to the Mesh Access Point or to a further blower also connected to said blower. Conversely, the intermediary blower serves to forward data to the blower, for example, instructions about a change in the operating mode and/or a reboot of a Mesh Access Point or of a further blower connected to it. Between the blower, the intermediary blower and the Mesh Access Point and/or the further blower, a data connection path is established. This increases the reliability of the entire network. In addition, blowers can communicate with each other, so that the failure of a single blower can also be detected more easily. Furthermore, with the same reliability, fewer Mesh Access Points are required, so that the blower system can be set up more cost-effectively.

Preferably, the intermediary blower can be connected to a plurality of blowers located within the same Mesh transmitting and receiving range and serves as a data node, i.e., the intermediary blower serves as an exchange point for the data or as a communication point between the blowers and with the Mesh Access Point.

In this context, it is also advantageous if the Mesh Access Point with the intermediary blower can be indirectly connected via at least one additional intermediary blower. Consequently, the at least one further intermediary blower is connected between the intermediary blower and the Mesh Access Point, so that there is a data connection path from the Mesh Access Point to the further intermediary blower and from the further intermediary blower to the intermediary blower, and finally from the intermediary blower to the blower.

The blower system can also include a further control and operating unit. This can be provided, for example, as a smartphone, as a laptop, as a tablet or as a desktop.

The object concerning the blower is achieved by a blower for a blower system, with a controller having a memory and a network interface in order to transmit the data stored in the memory, wherein the controller is designed so as to form a Mesh network with a Mesh Access Point for the wired or wireless connection between the blower and a further blower of the blower system and/or for the wireless or wired Mesh connection between the Mesh Access Point and the blower. Such blowers can be integrated into an existing blower system or Mesh network without great effort or can constitute the latter.

In particular, it is provided that the network interface is designed as a WIFI interface and/or as an Ethernet interface. By virtue of the wireless network interface, the blower system can be constructed and controlled particularly easily. In a preferred embodiment, the blower has both a network interface for a wireless network and a network interface for a wired network. This increases flexibility when using the blowers.

For better communication between the blowers and the control and operating unit and/or the control and operating unit via the BMS gateway, the blower also comprises a Modbus TCP interface. The Modbus TCP interface enables the control and operating unit and/or the BMS gateway to query the operating status for each individual blower, for example, the operating hours, the current speed, the engine status, the engine temperature, the actual value and the target value of the power of the blower, the number of accessible Mesh Access Points, an error message, a failure, etc., and to make the appropriate adjustments. The control and operating unit and/or the BMS gateway have IP addresses in the same IP address range.

For better identification of the individual blowers, it is provided in particular for the controller to be assigned an RFID tag, with a memory for storing an identification address and with a transmitting and receiving unit for sending and receiving the identification address. The RFID tag can be used to assign a unique identification address to each blower in order to be able to query information within the Mesh network with respect to the operating status of this blower, or to send individual targeted control commands to this blower. The RFID tag can be read and also written at the blower with a mobile device including an RFID reader, for example a smartphone. The configuration of the RFID tag can be carried out both at the time of manufacture of the blower and at the time the blower is installed in the clean room ceiling. In an alternative embodiment, it is possible for the RFID tag to have a default configuration, that is to say, no unique identification address. This allows for blowers to be combined to form groups and controlled together.

To visualize the operating status of the individual blowers, it is provided that each blower has an optical signal generator. This can be designed as an LED, which flashes at different frequencies as a function of the operating status or in response to an error. Furthermore, a plurality of optical or acoustic signal generators can be provided.

The object relating to the method for installing a blower system is achieved, i.e., by a method for installing a blower system for or in a clean room having a plurality of blowers, each of which is assigned a unique identification address, comprising the following steps: positioning the blowers and at least one Mesh Access Point connected to a control and operating unit in a wireless or wired manner in such a way that a transmitting and receiving range of the blower is located within the transmitting and receiving range of a further blower or within the Mesh transmitting and receiving range of the Mesh Access Point; connecting the blowers and the Mesh Access Point; and identifying and localizing the individual blowers in the Mesh network by a control and operating unit on the basis of their identification address.

The blowers are preferably installed in the ceiling of a clean room. The identification and localization of the individual blowers in the Mesh network can thereby take place by writing the RFID tag using a control and operating device. Each of the blowers is assigned a unique IP address within the Mesh network. The position of the blower is determined by a position detector arranged in the control and operating device and the identification address and the position are sent to the control and operating unit.

Addressing can be carried out by a service PIN installation. A magnet is pulled over a reed contact on the blower and the identification address of the blower is sent to the control and operating unit.

The control and operating unit can scan the Mesh network connected to it and to assign the blower addresses itself. Furthermore, it is also possible for the control and operating unit to scan one blower after the other within the Mesh network using a stored layout and to address it fully automatically.

The positions of the blowers and of the at least one Mesh Access Point can be checked and/or adjusted prior to positioning or after positioning by the following steps: querying a first transmission strength of a Mesh connection between one of the blowers and the nearest Mesh Access Point and/or querying a second transmission strength of a connection between one of the blowers and the neighboring blowers; and aligning the blowers (1) and the Mesh Access Point (7) in such a way that the first transmission strength and the second transmission strength are maximized with a minimized number of blowers required for the blower system.

The transmission strength can be understood to be the field strength or the signal strength of the data. The transmission strength can be separately accessed by any blower.

Thereby, it can be analyzed as to which Mesh Access Point having which transmission strength is connected to the respective blower. Checking and aligning can either be done in advance, i.e., preferably before installing the blowers in the ceiling of the clean room or after installing the blowers preferably in the ceiling of the clean room.

The object relating to the method for operating a blower system is also achieved by a method for operating a blower system having a plurality of blowers and by a control and operating unit controlling the blower system, wherein the blower system comprises at least one Mesh Access Point connected to the control and operating unit, which Mesh Access Point is designed to form a Mesh network with the blowers, characterized by the following steps: constructing the Mesh network by connecting the blower to the Mesh Access Point via a first data connection path if the blower is located within a Mesh transmitting and receiving range of the Mesh Access Point or connecting the blower via a second data connection path to a further blower, which is arranged within the Mesh transmitting and receiving range of the Mesh Access Point and is connected to the Mesh Access Point when the blower is arranged outside the Mesh transmitting and receiving range of the Mesh Access Point and within a transmitting and receiving range of the further blower; and constructing the Mesh network and transferring the data between the blower and the control and operating unit via one of the data connection paths.

The connection between the blowers and the Mesh Access Point can be wireless, but can also be wired, wherein it is particularly preferably designed to be wireless as a WLAN connection. This way, a network with blowers is constructed and operated, which are located both within and outside of the Mesh transmitting and receiving range of the Mesh Access Point. The control and operating unit is preferably designed as a building management system. The communication between the control and operating unit and each of the blowers is preferably carried out via Modbus TCP/IP or via Modbus UDP. Corresponding interfaces are formed on each blower and on the control and operating unit and/or on the BMS/gateway.

At least one intermediary blower serving as a data node can be arranged within the Mesh transmitting and receiving range, which is connectable to the Mesh Access Point having a first transmission strength and is connectable to the blower having a second transmission strength, and that step A1 comprises the additional step:

Forming the first data connection path by connecting the intermediary blower to the blower and the Mesh Access Point.

This means that not only the blowers are connected to the Mesh Access Point within the Mesh network, but also that the blowers are connected to each other. This way, a plurality of data communication paths is created, which maintain or operate the Mesh network and thus the blower system even in the event of the failure of any individual blowers. According to the invention, intermediary blowers are understood to be blowers arranged between one of the blowers not directly connected to the Mesh Access Point and one of the Mesh Access Points. Between the blower and the Mesh Access Point, it is possible for a plurality of intermediary blowers to be arranged, so that the first data transmission path is formed by connecting the intermediary blower to the blower and to a further intermediary blower associated with the Mesh Access Point.

In this context, it is provided that in the event of failure or removal of one of the blowers from the blower system, the method comprises the following steps: separating the connection between the blower and a blower to be removed or deactivated; and refreshing the Mesh network.

To simplify the expansion of the blower system, the method in particular includes the following steps: adding a new blower to the existing blower system and refreshing the Mesh network.

To speed up the data transmission and to adapt the data transmission to the current conditions, the method in particular includes the following steps: detecting a plurality of possible data connection paths; and selecting the data connection path which has a minimal data transmission time on the basis of the number of required data nodes and the transmission strength.

This creates an extraordinarily dynamic blower system, since at all times, the optimal and fastest data connection path between a blower of the blower system and the control and operating unit is created.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
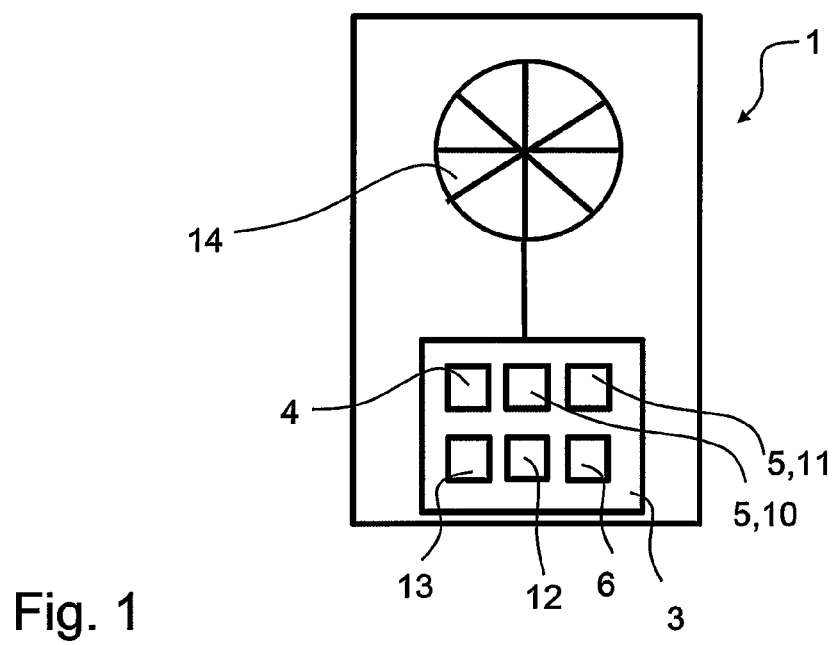
FIG. 1 is a schematic representation of the inventive blower.

FIG. 1 shows a schematic representation of the inventive blower 1 for a blower system 2, in particular for a clean room. This includes a controller 3 connected to a blower fan 14, which has a memory 4 and a network interface 5 in order to transmit the data stored in the memory 4. The controller 3 also includes a control unit 6, by means of which the blower 1 is operated. In addition, the controller 3 is designed to form a Mesh network with a Mesh Access Point 7, for the wireless or wired connection 8 between the blower 1 and a further blower 1 of the blower system 2 and/or for the wireless or wired Mesh connection 9 between the Mesh Access Point 7 and the blower 1.

As a network interface 5, the blower 1 has a WIFI interface 10 and an Ethernet interface 11. The blower 1 can consequently communicate both via a wireless network connection and via a wired network connection. A wired network connection proves to be particularly advantageous if the blower 1 is to be positioned in an area of the clean room without WIFI reception. In addition, the controller 3 is assigned an RFID tag 12 with a memory (not shown) for storing an identification address and with a transmitting and receiving unit (not shown) for sending and receiving the identification address. Finally, the blower 1 also has an optical signal generator 13 to indicate its operating status. The optical signal generator 13 is preferably designed as one or more LEDs and is also designed such as to visualize different error messages based on different flashing signals. Alternatively, the signal generator can also be designed as an acoustic signal generator.

Figure 2:
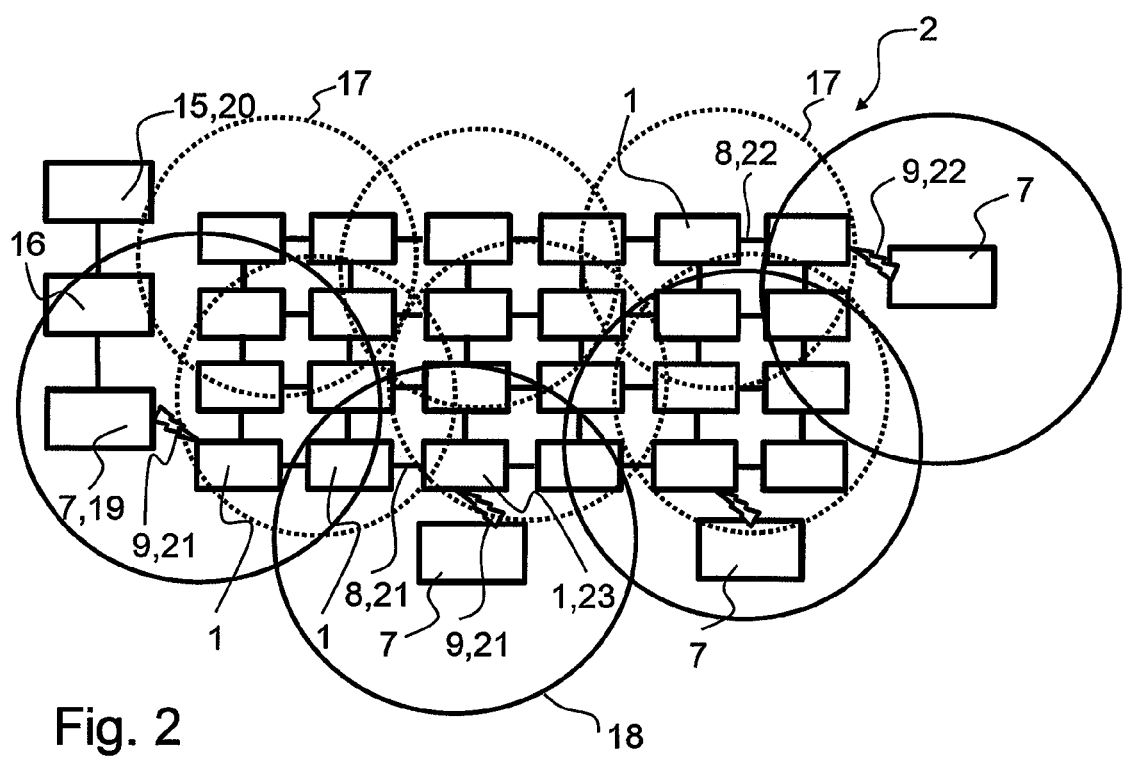
FIG. 2 is a schematic representation of the blower system forming a Mesh network.

FIG. 2 shows a schematic representation of the blower system 2 with a control and operating unit 15 designed as a building management (BMS) 20 system for controlling a plurality of blowers 1. The control and operating unit 15 is connected via a bus system to a BMS gateway 16 and the BMS gateway 16 is in turn connected to a first Mesh Access Point 7,19, respectively. The Mesh Access Point 7,19 is designed to construct a Mesh network in such a way that at least one of the blowers 1 has a wireless or wired Mesh connection 9 with the Mesh Access Point 7,19, and that each of the blowers 1 can be connected to at least one further blower 1 in a wireless or wired manner. The control and operating unit 15 can control or actuate the individual blowers 1 via the Mesh network and each of the blowers 1 can send its current operating status to the control and operating unit 15.

The individual blowers 1 have a spatial transmitting and receiving range 17 and are arranged relative to one another in such a way that at least one further blower 1 or one Mesh Access Point 7 is located within its transmitting and receiving range 17. In the present exemplary embodiment, the blowers 1 and the Mesh Access Point 7 are connected to one another wirelessly via WIFI. The transmitting and receiving ranges 17 of the blowers 1 are shown as dashed circles, whereas a Mesh transmitting and receiving range 18 of the Mesh Access Point 7,19 is represented by circles with a solid line.

In order to design the blower system 2 as large as possible, and to improve the accessibility of the individual blowers 1 within the Mesh network, the blower system 2 comprises a plurality of Mesh Access Points. In the present exemplary embodiment, the Mesh network comprises a total of four Mesh Access Points 7, these being arranged with respect to one another such that their Mesh transmitting and receiving ranges 18 overlap.

The installation of the blower system 2 is carried out as follows: First, the blowers 1 and the Mesh Access Points 7 are positioned within, for example, the ceiling of the clean room in such a way that the transmitting and receiving range 17 of each blower 1 is arranged within the transmitting and receiving range 17 of a further blower 1 or within the Mesh transmitting and receiving range 18 of the Mesh Access Point 7. At least the first Mesh Access Point 19 is connected to the BMS gateway 16 via an interface, preferably an Ethernet interface. This is in turn connected via a bus system to the building management system 20.

Next, the blowers 1 and the Mesh Access Points 7 are connected to each other.

Optionally, before positioning the blowers 1 in the clean room ceiling, the position or alignment of the blowers 1 and the at least one Mesh Access Point 7 can be adjusted and/or checked. For this purpose, a first transmission strength of a Mesh connection 9 between one of the blowers 1 and the nearest Mesh Access Point 7 and/or a second transmission strength of a connection 8 between one of the blowers 1 and the adjacent blowers 1 is queried. The blowers 1 are then arranged with respect to one another in such a way that a number of blowers within the blower system can be minimized, with the second transmission strength being maximized in the process. The transmission strength is defined as a transmitting and receiving strength. The blower system is thus optimized by minimizing the number of blowers required for the blower system, which are then aligned with one another in such a way that the highest possible transmission strength is achieved.

For one, the Mesh Access Points 7 are aligned such that the Mesh transmitting and receiving ranges 18 overlap, and secondly, that a number of the Mesh Access Points required for the blower system are minimized while at the same time achieving the highest possible transmission strength. In an alternative embodiment, the adjustment and/or checking of the position or alignment can also take place after positioning the blower 1.

Finally, the individual blowers 1 in the network are identified on the basis of their identification addresses. This takes place, for example, via the RFID tag 12 in that a control and operating device, which has an RFID reader and is not shown, assigns a unique identification address to each blower 1 and, via its position detection unit, communicates the exact identification address (IP address) of the blower 1 and its position within the network to the building management system 20.

The operation and checking of the blower system 2 take place as follows:

The building management system 20 controls and operates the blowers 1. The data communication between the building management system 20 and the individual blowers 1 takes place by means of data transmission via the Mesh network. The construction of the Mesh network is exemplified using a blower 1:

The blower 1 is connected via a first data connection path 21 to the nearest Mesh Access Point 7 when the blower 1 is located within the Mesh transmitting and receiving range 18 of this Mesh Access Point 7. If the blower 1 is located outside the Mesh transmitting and receiving range 18 of the Mesh Access Point 7 but is arranged within a transmitting and receiving range 17 of a further blower 1, then the blower 1 is connected to the further blower 1 via a second data connection path 22. These steps are carried out for all blowers 1 of the blower system 2. The Mesh Access Point 7 can also communicate wirelessly with the Mesh gateway 16.

Within the Mesh network, not only are the blowers 1 connected to the Mesh Access Points 7, but also the blowers 1 to each other. Adjacent blowers 1, which are designed as intermediary blowers 23 and are located within a Mesh transmitting and receiving range 18, thus serve as data nodes.

This intermediary blower 23 can be connected to the Mesh Access Point 7 with a first transmission strength and to the blower 1 with a second transmission strength. Alternatively, an intermediary blower 23 may also be not directly connected to one of the Mesh Access Points 7, but only indirectly via a further intermediary blower 23. The first data connection path 21 is formed by connecting the intermediary blower or blowers 23 to the blower 1 and the Mesh Access Point 7.

This enables each of the blowers 1 to be able to be connected via many different data connection paths 21, 22 to the Mesh Access Point 7 and thus to the building management system 20, and to communicate with the latter. The Mesh Access Points 7 detect that a plurality of data connection paths 21,22 is possible and choose the data connection path 21,22 which has the least data transmission time. This is preferably done by minimizing the number of required data nodes with the maximum possible transmission strength.

By means of the Mesh network of the blower system 2, data can be transmitted via the operating status to the BMS gateway 16 or to the BMS 20. Conversely, the BMS 20 or the BMS gateway 16 can control individual blowers 1 or groups of blowers 1 in order to check error messages or to control the blower 1 itself.

A particular advantage of the blower system 2 according to the invention is the fact that there is no single point of failure. This means, should a blower 1 fail due to a failure in the electronics or due to self-shutdown because of an excessively high operating temperature, the entire Mesh network does not break down and thus also not the entire blower system 2. Instead, the blower system 2 is dynamic owing to the Mesh network and is constantly being refreshed in order to search for the optimal data communication path 21, 22 for the respective blower 1.

Furthermore, the removal of a blower 1 from and the addition of a blower 1 to the blower system 2 are extremely simplified. The new blower 1 only has to be assigned a new identification address and a position, and the Mesh network has to be refreshed. The removal of the blower 1 is preferably accompanied by an error message to the BMS 20 or the BMS gateway 16, showing that a blower 1 can no longer be controlled. By refreshing the Mesh network, it is ensured that the other blowers 1 can be controlled.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for installing a blower system for a clean room having a plurality of blowers, each associated with a unique identification address, the method comprising:

positioning the blowers and at least one Mesh Access Point, which is connected to a control and operating unit in a wireless or wired manner, in such a way that a transmitting and receiving range of one of the blowers is disposed within a transmitting and receiving range of a further one of the blowers or within a Mesh transmitting and receiving range of the at least one Mesh Access Point;

connecting the blowers and the at least one Mesh Access Point in a wireless or wired manner to construct a Mesh network; and identifying and localizing the individual blowers in the Mesh network on the basis of the unique identification address associated with each of the blowers using a control and operating device.

2. The method according to claim 1, wherein a position of the blowers and of the at least one Mesh Access Point is adjusted and/or checked by the following steps:

querying a first transmission strength of the Mesh connection between one of the blowers and the nearest Mesh Access Point; and/or querying a second transmission strength of the Mesh connection between one of the blowers and an adjacent blower; and aligning the blowers and the Mesh Access Points in such a way that the first transmission strength and the second transmission strength are maximized with a minimized number of blowers required for the blower system.

* * * * *